3,042,708
SEPARATION OF ESTERS OF NAPHTHALENE
Ivor W. Mills, Glenolden, Henry C. Beck, Wallingford, and James L. Jezl, Swarthmore, Pa., assignors to Sun Oil Company, Philadelphia, Pa., a corporation of New Jersey
No Drawing. Filed Dec. 11, 1959, Ser. No. 858,873
5 Claims. (Cl. 260—469)

This invention relates to a method for the separation of mono and diesters of naphthalene carboxylic acids.

In a copending application, Serial No. 851,229, filed November 6, 1959, and assigned to the same interests there is described a process for the preparation of naphthalene dicarboxylic acids. Briefly, the process comprises contacting a dimethylnaphthalene isomer with oxygen and a cobalt salt at oxidation conditions to produce the corresponding naphthalene dicarboxylic acid isomer. The diacid product is contaminated with from about 30 to about 60 weight percent mono-acid.

At the present time, there is an interest in the diesters of naphthalene dicarboxylic acids for use in the making of polyester fibers. We have found that diesters of napthalene may be separated from the monoesters in good yield.

Broadly speaking, the procedure of the invention comprises esterifying a mixture of naphthalene mono and diacids and extracting with a non-polar solvent followed by cooling to precipitate the monoester. The desired diester remains in solution and may be separated from the solvent by conventional means such as distillation.

The esterification step is conducted in the presence of an alcohol and an acidic catalyst. Low molecular weight alcohols containing 1 to 6 carbon atoms per molecule such as methanol, ethanol, n-propyl and isopropyl alcohol are suitable esterification agents. From about 3 to about 20 grams of alcohol are used per gram of naphthalene acid feed. Inorganic acids are suitable catalysts. Examples are $H_2SO_4$, HCl, $H_3PO_4$, $BF_3$ and HF. The preferred members of this group are HCl and $H_2SO_4$. The latter is used in concentrations of 90 to 100 percent or more. The catalyst is employed in amounts of 1 to 20 percent by weight based on the naphthalene carboxylic acid feed. The best yields are obtained when operating at reflux temperatures. Temperatures in the range of 100 to 300° F. are suitable but not limiting since higher or lower temperatures may be used. Pressures may range from atmospheric to 150 p.s.i.g. Subatmospheric pressures may be used but they require special equipment. Pressures of 50 to 80 p.s.i.g. are very suitable since the higher reflux temperatures permit a fast reaction rate.

The separation step is conducted in the presence of a monocyclic aromatic hydrocarbon solvent such as benzene or an alkyl-substituted benzene or mixtures thereof. The solvent preferably has a boiling point below 200° C. and examples are benzene, toluene, xylene, durene, cumene and ethylbenzene. Benzene and toluene are the most suitable solvents. Aliphatic solvents are not suitable because the naphthalene esters are not sufficiently soluble in them. The esters are contacted with the solvent at a temperature in the range of from 50 to 250° F. Best results are obtained by heating to a temperature just below the boiling point of the solvent but heating of this type is not absolutely required. The naphthalene monester begins to precipitate as soon as the solvent is added. The solution is cooled to a temperature just above the crystallization temperature (i.e., freezing point) of the solvent to effect complete precipitation of the monester. This is about 45 to 50° F. in the case of benzene. The crystallization temperature of any solvent is easily determined by one skilled in the art.

The crude crystalline acids are prepared as follows:

25 g. of 2,6-dimethylnaphthalene, 250 mls. of propionic acid and 12.5 grams of cobalt acetate hydrate were placed in a three-necked flask, equipped with a motor-driven stirrer and a reflux condenser for return of vaporized solvent. The solution was contacted with 300 cc. of oxygen per minute while stirring at 1300 r.p.m. Temperature was maintained in the range of from 125 to 129° C. After six hours the reaction was stopped and a precipitate of solid green acids (containing cobaltic ion) isolated on a filter. These green acids were added to 250 mls. of fresh solvent containing 12.5 grams of additional catalyst and oxidation was continued using the same flow rate, temperature and stirring. After 28 hours, the product contained 98 weight percent acids of which 77 percent were diacids (determined by acid number).

The process of the present invention is illustrated by the following specific example:

390 grams of mixed mono and 2,6-dimethyl naphthalene carboxylic acids containing about 25 percent by weight monoacids and about 75 percent by weight diacids were charged to a three-necked flask together with 700 mls. of methanol. 75 mls. of 100 percent $H_2SO_4$ were added and the flask was heated to reflux temperature at atmospheric pressure (149 F.±3°). After about eight hours, the reaction was stopped. On cooling to room temperature (75° F.), the product was filtered to obtain a filter cake comprising mono and diesters of naphthalene. 250 grams of mixed esters were contacted with 3500 cc. of benzene. These esters are soluble in benzene and the unconverted acids largely are not. The material which went into solution in benzene is decanted and cooled to 50° F. A batch of crystals weighing 40 gms. is obtained which had a saponification number of 272. (Theoretical saponification number for pure monester—280.) The material in solution had a saponification number of 414. (Theoretical saponification number for pure diester—460.) The benzene solution may be washed with $K_2CO_3$ to remove any organic acids or hemiester which may be present. The diester is recovered from the solvent by any suitable means such as distillation. The entire process of this example was conducted at atmospheric pressure.

We claim:

1. A process for the separation of mono and diesters of naphthalene carboxylic acids comprising the steps of esterifying the acids with a low molecular weight alcohol selected from the group consisting of methanol, ethanol, n-propyl alcohol, and isopropyl alcohol in the presence of an inorganic acid catalyst dissolving the mixed esters in a monocyclic aromatic hydrocarbon solvent and cooling the solution to a temperature at which a substantial proportion of the monester is selectively precipitated.

2. The process according to claim 1 wherein the aromatic hydrocarbon solvent is selected from the group consisting of benzene and toluene.

3. The process according to claim 1 wherein the diester is the 2,6-isomer and the solvent is benzene.

4. A process for the separation of mono- and diesters of naphthalene carboxylic acids consisting essentially of the steps of dissolving a mixture of the esters in a monocyclic aromatic hydrocarbon solvent and cooling the solution to a temperature at which a substantial proportion of the monoester is selectively precipitated.

5. The process according to claim 4 in which the diester is the 2,6-isomer and the solvent is benzene.

References Cited in the file of this patent
UNITED STATES PATENTS 2,879,288     Grosskinsky et al. _____ Mar. 24, 1959
2,906,774     Raecke et al. _____ Sept. 29, 1959
2,911,420     Brown et al. _____ Nov. 3, 1959

OTHER REFERENCES

Gattermann: "The Practical Methods of Organic Chemistry," pages 1–14 (MacMillan) (1896).

Beilstein: "Handbuch der organischen Chemie," H. W. page 657, 921, page 666 (1926).

Hougen, Watson and Ragitz: "Chemical Process Principals," 2nd ed., pages 152–159 (Wiley) (1954).